Sept. 20, 1938. W. I. JONES 2,130,548
FASTENER
Filed June 11, 1935
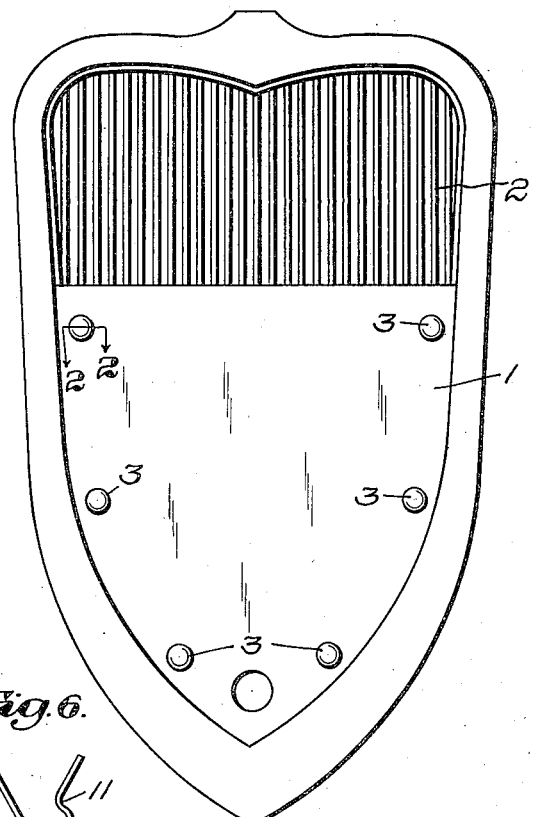
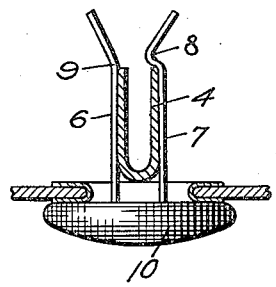
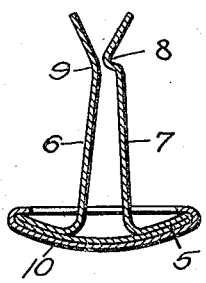
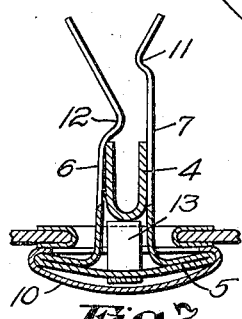
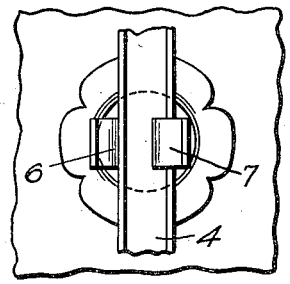
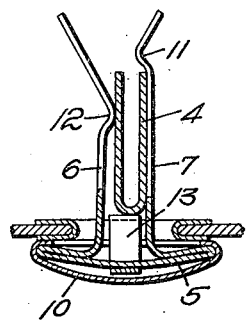
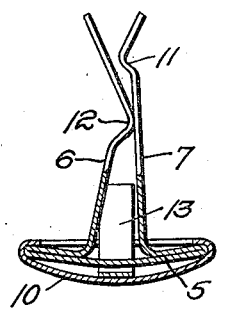
Inventor:
Walter I. Jones Patented Sept. 20, 1938

2,130,548

UNITED STATES PATENT OFFICE 2,130,548

FASTENER

Walter I. Jones, Arlington, Mass., assignor to United-Carr Fastener Corporation, Cambridge, Mass., a corporation of Massachusetts Application June 11, 1935, Serial No. 26,004

4 Claims. (Cl. 24—259)

My invention relates to improvements in the fastening means used to secure a cover to an automobile radiator grille.

In the drawing which illustrates preferred forms of my invention:—

Figure 1 is a front view of a complete installation showing the use of my improved fasteners;

Fig. 2 is an enlarged section taken on the line 2—2 of Fig. 1;

Fig. 3 is a section of the improved fastener shown in Fig. 2;

Fig. 4 is an enlarged rear view of a fragment of the installation shown in Fig. 1, including one fastener and support and the adjacent part of the cover;

Fig. 5 is an installation in section including a second form of my improved fastener, a support and the adjacent part of the cover;

Fig. 6 is an installation in section including the second form of my improved fastener, the adjacent part of the cover and a support of less depth than that shown in Fig. 5; and Fig. 7 is a section of the second form of my improved fastener shown in Figs. 5 and 6.

The object of my invention is to provide a more useful fastener means for securing a flexible cover to an automobile radiator grille.

It is well known that the several automobile grilles now in use vary greatly as regards the thickness and depth of their supporting bars. It is especially because of this difference in the depths of the supporting bars that it has been necessary in most cases to manufacture a special fastener for each of the several different grilles.

It is the aim of my present invention to provide a fastener of simple construction which is substantially universal in utility and, therefore, adapted to fit the majority of the present-day automobile grilles for the purpose of attaching a flexible cover thereto.

Referring now to the accompanying drawing, I have shown a flexible cover 1 cut to the proper shape and covering as much of the radiator as desired. This cover may be made of any material which will successfully carry out its purposes, as for example, in cold weather of preventing freezing of the cooling liquid and aiding the engine to heat to a proper temperature more rapidly. Securing this cover 1 to the ornamental grille 2 are a plurality of fasteners 3 which are located in apertures in the cover and engage the underlying bars 4, as best shown in Figs. 2, 5 and 6.

Referring to the fastener itself, I have shown two forms. The first form, represented by Figs. 2 and 3, is made of a single piece of sheet metal and is formed by bending a strip of flat spring metal into the form shown in Fig. 3. It has a head portion 5 and the yieldable arm portions 6 and 7 formed by folding the free ends of the strip under the head for a short distance and then bending them substantially perpendicular to the plane of the head portion. At a point adjacent to the free end of the arm 7, I have formed the angled shoulder 8, the free end of the arm 7 extending away from the arm 6. At a point 9 on the arm 6, I have bent the arm 6 away from the arm 7 as shown in Figs. 2 and 3, the free ends of the two arms thereby providing a diverging surface to allow the arms to be wedged apart when the bar 3 is inserted between them. A cap 10 is attached to the head in order to facilitate handling of the fastener and to give it a more attractive appearance.

When the bar 4 is engaged with the fastener as shown in Fig. 2, the spring arms 6 and 7 will bear firmly against the sides of the bar, the shoulder 8 preventing the easy dislodgment of the bar from its seat.

In Figs. 5, 6 and 7, I have illustrated a second form of fastener which is similar to that shown in Figs. 2 and 3. The novel feature of this form of my invention is that the fastener is so constructed that it may engage grille bars of different dimensions.

In Fig. 7, I have shown a fastener having a head portion and two spring arms extending from beneath the head portion, all of which have been formed in the same manner as those of the fastener in Figs. 2 and 3. The difference is in the fact that I have provided on each arm of my second form an outwardly extending shoulder portion which is located thereon at a spaced distance from the head portion. These shoulder portions, which have been marked 11 and 12 in the drawing, are not located on their respective arms at equal distances from the head portion, but instead are placed so that one of the shoulders is nearer to the head portion than the other. The arms adjacent to the side of the shoulders away from the head portion are extended away from each other to provide a diverging surface for engagement with the grille bar.

Between the cap and the head portion of my second form of fastener, I have assembled a U-shaped clip member 13. This member is preferably formed from bendable sheet metal and its arms extend away from the head of the fastener in the same direction as the arms 6 and 7, but then are bent so as to lie in a plane substantially perpendicular to the plane of the arms 6 and 7. The purpose of the member 13 is to secure the fasteners to the cover so that when the cover is removed from the grille, there is no chance of the fasteners becoming lost or misplaced.

To engage my second form of fastener with a grille bar, the V-shaped divergence of the fastener arms is pushed against the proper bar with the result that the arms will be forced apart until the bar has passed the shoulder by which it is to be held in place, at which time the arms will spring together again.

Due to the shoulders which I have provided in my second form, it is possible to securely engage bars of varying depths within the arms of the fastener. In Fig. 5, I have shown a bar of relatively great depth which is securely held in place by the force of the arms 6 and 7 upon each of its sides, the shoulder 11 preventing its dislodgment. In Fig. 6, I have shown a bar of much lesser depth which likewise is held in place by the spring action of the arms, the shoulder 12 preventing its easy unloosement.

The shoulder portions of both types of fasteners are shaped on their sides nearest the head portion so that bars of various cross-sections may be held in spring engagement with the fasteners.

While I have illustrated and described preferred embodiments of my invention, I do not wish to be limited thereby, because the scope of my invention is best defined by the following claims.

I claim:

1. A fastener unit formed from a strip of spring metal, said fastener unit having a head portion, a pair of yieldable arms extending from beneath said head portion for receiving a part between them to which the fastener is to be attached, one of said arms having an angled shoulder adjacent to its free end, the other of said arms being shoulderless at a point opposite the shoulder on said first arm, the free ends of said arms diverging from each other to provide surfaces for wedging the arms apart when a bar is entered between said diverging portions.

2. A fastener unit formed from a strip of spring metal of considerably greater width than thickness, said fastener having an elongated head portion with folded under ends, a pair of opposed flat yieldable arms extending from the inner ends of said folded under portions directly away from said head for receiving a part between them to which the fastener is to be attached, one of said arms having a relatively abrupt shoulder adjacent to its free end and at a spaced distance from said head portion, the opposite of said arms being shoulderless at a point opposite the shoulder on said first arm, the free ends of said arms diverging from each other to provide surfaces for wedging the arms apart when a bar is entered between said diverging portions.

3. In a spring clip for use in holding an automobile-radiator-cover to the grill bar of an automobile radiator, a spring head, a pair of elongated sides extending from the head and provided with diverging free ends, and inwardly bent parts of said sides extending inwardly and integrally at spaced intervals from the material of said sides and in relatively staggered relation and having bends therein of sufficiently different distances from the head to engage the edges of grill bars of different widths.

4. In a spring clip, a pair of sides and a plurality of holding members arranged intermediate the ends of said sides, each of said members being bent from the material of the sides in the form of a reverse curve, and extending inwardly and laterally of the sides, the innermost points of the bends of said members being arranged at different distances from the line extending midway between said sides, and at different distances from the end of said clip.

WALTER I. JONES.